Nov. 24, 1925.
C. E. SNYDER
1,562,598
MOLDING TAPE
Filed Oct. 30, 1923
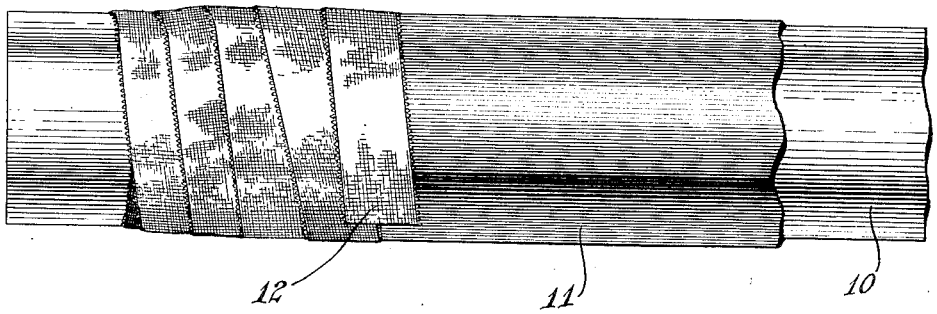
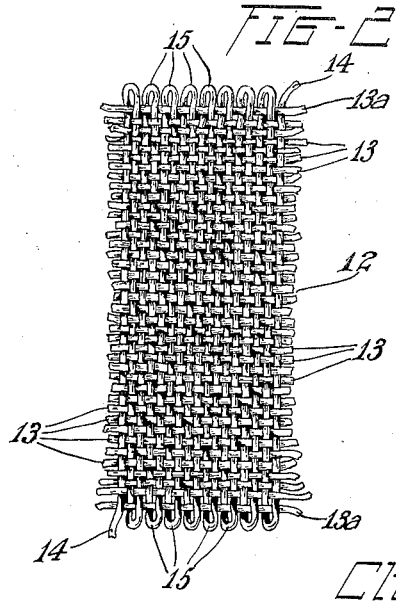
Inventor
Clarence E. Snyder.
By Robert M. Pierson
Atty Patented Nov. 24, 1925.

1,562,598

UNITED STATES PATENT OFFICE.

CLARENCE E. SNYDER, OF AKRON, OHIO, ASSIGNOR TO THE B. F. GOODRICH COMPANY, OF NEW YORK, N. Y., A CORPORATION OF NEW YORK.

MOLDING TAPE.

Application filed October 30, 1923. Serial No. 671,688.

*To all whom it may concern:*

Be it known that I, CLARENCE E. SNYDER, a citizen of the United States, residing at Akron, in the county of Summit and State of Ohio, have invented a certain new and useful Molding Tape, of which the following is a specification.

This invention relates to ribbons or molding tapes such as are used in the manufacture of inner tubes for pneumatic tires, wherein the respective ends of an unvulcanized rubber tube upon its mandrel are tightly bound with the tape to prevent the entrance of steam between the tube and mandrel and to bevel or skive the tube during vulcanization, so that they may subsequently be joined in a beveled splice to form an endless tube.

Heretofore, so far as I am aware, the beveling of tube ends in this way has been done with the ordinary "friction" tape, or with relatively narrow, untreated strips of fabric cut from a wide sheet, the use of tape having a selvage edge being avoided because of its hard lateral margins, which leaves a mark in the rubber of the tube. Neither of the tapes heretofore employed are entirely satisfactory, however, because the "friction" tape acquires a permanent, helical "set", when subjected to vulcanizing heat, and can be used but once, and the tape having cut edges ravels out at its margins, shortening its life and rendering it difficult to handle.

The chief objects of my invention are to provide a tape for the purpose specified which will not acquire a permanent "set" when used, which will withstand heat and moisture so that it may be used repeatedly, which will not ravel at its margins, and which will have relatively soft edges such as not to mark the tube on which it is used.

Of the accompanying drawings:

Fig. 1 is a side elevation of one end portion of an unvulcanized rubber tube upon a mandrel, and a preferred form of my improved tape as applied thereto.

Fig. 2 is a view on a large scale of a short length of said tape.

Referring to the drawings, 10 is a cylindrical, metallic mandrel upon which is mounted an unvulcanized rubber tube 11, whose ends may be roughly beveled or stepped down. Said tube may be either built upon the mandrel or extruded from a tubing machine and then mounted upon the mandrel for vulcanization. 12 is a length of tape, wound upon the tube, from the end of the tube toward its middle, in overlapping helical convolutions, the first-wound end of said tape being anchored by the overlying convolutions, and the last wound end of the tape being stuck to the underlying rubber and convolution of tape, the tape usually being sufficiently damp from the spray-cooling at the end of the preceding vulcanizing operation to adhere to the underlying materials. During the next vulcanizing operation, in open steam, the tape, being mounted as shown in Fig. 1, causes the softened rubber to flow so as to form a smooth bevel upon the end of the tube.

As shown in Fig. 2 the tape 12 is square woven, comprising a set of warp threads 13, 13, a marginal warp thread $13^a$, $13^a$ at each side thereof, and a continuous or reversed weft thread 14, looped loosely about the respective marginal warp threads $13^a$, in a marginal series of loops 15, 15, which in use will flatten and lie in the general plane of the tape, thus providing soft, relatively thin edges, such as will not leave objectional marks upon the vulcanized tube, and yet will not ravel.

I thus provide a tape having the several advantages contemplated in the above statement of objects.

My invention is susceptible of modification within its scope, and I do not wholly limit my claims to the exact construction shown and described.

I claim:

1. A narrow molding tape having soft, thinned margins, said tape comprising a set of warp threads spaced with substantial uniformity throughout the width of the tape and a reversed weft thread closely interwoven with the warp threads and extending materially beyond the outermost warp threads to provide the tape with relatively thin margins of substantial width.

2. A narrow molding tape having soft, thinned margins of substantial width, said tape comprising a set of warp threads and a reversed weft thread closely interwoven with the warp threads throughout the width of the tape and loosely looped about the last warp threads at the margins of the tape, the loops being of such length that shrinkage of the tape will not draw the loop-ends into close proximity with the said last warp threads.

In witness whereof I have hereunto set my hand this 27 day of October, 1923.

CLARENCE E. SNYDER.